United States Patent
Clarke et al.

[11] Patent Number: 6,120,854
[45] Date of Patent: Sep. 19, 2000

[54] LIQUID CRYSTAL POLYMER COATING PROCESS

[75] Inventors: James A. Clarke, Greenlawn; Carmine Persiani, Medford, both of N.Y.

[73] Assignee: Northrop Grumman, Los Angeles, Calif.

[21] Appl. No.: 09/253,451

[22] Filed: Feb. 19, 1999

[51] Int. Cl.[7] ........................................ B05D 1/08
[52] U.S. Cl. .................. 427/447; 427/446; 427/314; 427/318; 427/374.4; 427/374.6; 427/388.1; 427/384
[58] Field of Search ................... 427/447, 446, 427/314, 318, 374.4, 374.6, 388.1, 384

[56] References Cited

U.S. PATENT DOCUMENTS

| | | | |
|---|---|---|---|
| 4,336,276 | 6/1982 | Bill et al. | 427/34 |
| 4,505,945 | 3/1985 | Dubust et al. | 427/446 |
| 5,019,686 | 5/1991 | Marantz | 219/76.14 |
| 5,144,110 | 9/1992 | Marantz et al. | 427/446 |
| 5,206,259 | 4/1993 | Shuto et al. | 514/406 |
| 5,216,092 | 6/1993 | Huspeni et al. | 525/444 |
| 5,296,542 | 3/1994 | Layton et al. | 524/600 |
| 5,434,210 | 7/1995 | Rangaswamy et al. | 524/406 |
| 5,530,050 | 6/1996 | Rangaswamy | 524/430 |
| 5,834,064 | 11/1998 | Dietz et al. | 427/388.1 |

FOREIGN PATENT DOCUMENTS

| | | | |
|---|---|---|---|
| 555 195 A1 | 8/1993 | European Pat. Off. | 427/447 |
| 39 41 862 | 6/1991 | Germany | 427/447 |

*Primary Examiner*—Katherine A. Bareford
*Attorney, Agent, or Firm*—Terry J. Anderson; Karl J. Hoch, Jr.

[57] ABSTRACT

Plasma spraying of particulate thermotropic liquid crystalline polymers onto the surfaces of composite and metallic structures. The present plasma spray process employs a conventional direct current electric arc plasma spray gun in which an inert plasma gas is introduced, caused to swirl, and discharges as a rotating plasma flame having an exceptionally high temperature, above about 14000° K, into which the particulate liquid crystal polymer is discharged for melting and propulsion onto the target surface. The target surface preferably is preheated, and the molten particles deposit and cool to form a build up of the desired thickness. Cooling is regulated by post-heating the deposit to a temperature between about 200° F. and 500° F.

11 Claims, 1 Drawing Sheet

LIQUID CRYSTAL POLYMER COATING PROCESS

BACKGROUND OF THE INVENTION

1. Field of the Invention

The present invention relates generally to novel coating processes for coating substrates, such as advanced composite structures, aluminum, titanium, steel, etc., to prevent or retard damage caused by oxidation, moisture, erosion, fouling, salt spray, wear, ultraviolet radiation, impact, temperature extremes and chemicals. The surfaces of such substrates, particularly on structures on ships, military and commercial aircraft experience significant damage and degradation due to these causes and therefore must be protected to avoid failure and frequent repair or replacement.

2. State of the Art

A wide variety of protective coatings are known for application to such surfaces to prevent or reduce degradation due to one or more of the aforementioned causes. Some such coatings are bondable only to metal surfaces and/or provide protection against damage caused by only certain ones of the aforementioned factors. Also, many such coatings are applied by means of volatile organic solvents or vehicles which are environmentally and physically dangerous and/or contain heavy metals such as chromium, cadmium, lead, etc., which likewise are dangerous and objectionable. Most such coatings are not repairable and/or require application temperatures which preclude use on installations such as fueled aircraft, housings for electronic equipment, etc.

Reference is made to U.S. Pat. No. 5,530,050 for its disclosure of a thermal spray powder coating composition for forming abradable coatings on turbine shrouds, compressor housings and seals. The powder compositions contain 80 to 99% by weight of zirconia and 1 to 20% by weight of ceramic-coated plastic core particles. The plastic core can comprise any one of a wide variety of different types of heat-resistant plastics, including liquid crystal polymers. The compositions are sprayed onto the target surface using one or more thermal spray guns to produce abradable coatings which are only disclosed to have superior high temperatures properties.

Reference is also made to U.S. Pat. Nos. 5,216,092 and 5,296,542 which disclose extrusion and molding resin compositions comprising blends of liquid crystal polymers comprising aromatic polyesters.

Finally reference is made to U.S. Pat. No. 5,019,686 for its disclosure of known thermal spray devices and techniques, including plasma spray processes which use a high velocity gas plasma to spray powdered or particulate coating compositions onto a substrate to form a high density coating.

SUMMARY OF THE INVENTION

The present invention involves the unique combination of plasma spraying and advanced particulate polymeric compositions based upon thermotropic liquid crystalline polymers to achieve the extraordinary ability to enhance the durability of the surfaces of composite and metallic structures, enhancing the operational performance of such structures under severe environments while, at the same time, cutting maintenance costs, increasing life cycles and reducing hazardous wastes associated with the most conventional coatings. The invention improves the performance properties of composite laminates to such an extent that the use of such laminates can be increased as substitutes for heavier metal structures to reduce the weight of vehicles and other bodies.

The advanced particulate polymeric compositions used according to the present plasma spray thermal process are high melting point thermoplastic liquid crystal polymers comprising aromatic copolyesters, copolyester-amides, multiple monomer wholly aromatic polyesters, and similar liquid crystalline thermoplastic polymers having melting points above about 300° C. and which are exceptionally impervious to moisture and oxygen as compared to other known polymeric materials.

The present plasma spray process is one employing a conventional direct current electric arc plasma spray gun in which an inert plasma gas is introduced to the gun, caused to swirl between a cathode and an exit anode nozzle and discharges as a rotating plasma flame having an exceptionally high temperature, into which the particulate liquid crystal polymer is discharged for melting and propulsion onto the target surface where the molten particles deposit and cool to form a build up of the desired thickness.

BRIEF DESCRIPTION OF THE DRAWINGS

In the accompanying drawing.

DETAILED DESCRIPTION OF THE PREFERRED EMBODIMENTS

Figure 1:
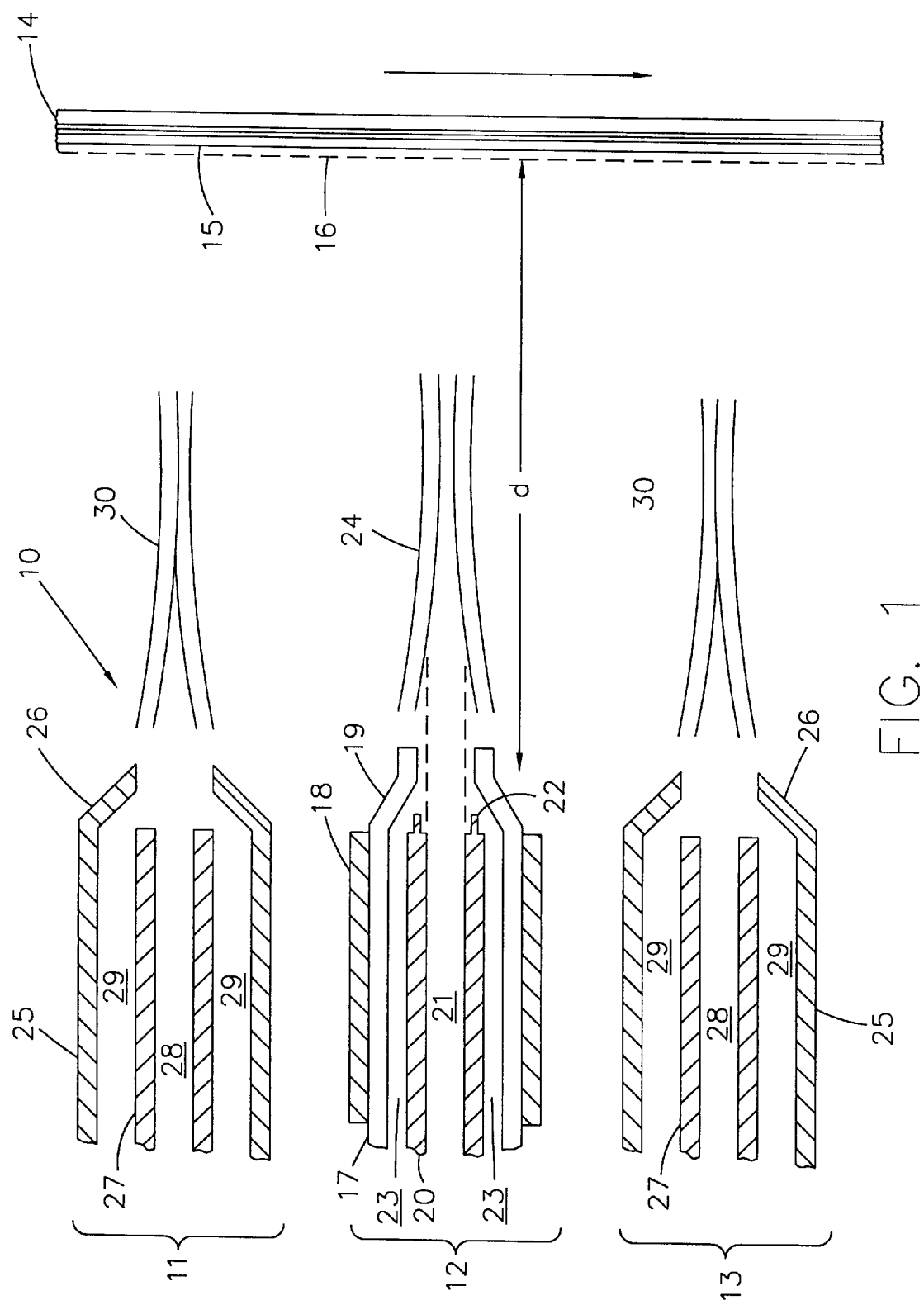
FIG. 1 is a cross-sectional illustration of a plasma spray gun apparatus during operation, depositing a molten particulate protective layer onto the surface of a composite substrate, according to a preferred embodiment of the present invention in which pre-heat and post-heat thermal spray guns are associated with the plasma spray gun.

The physical liquid crystal polymer compositions used according to the process are high melting point thermoplastic polymers.

LCPs are distinguished from other plastics by their rod like microstructure in the melt phase. Other resins have randomly oriented molecules in the melt phase, but when LCPs melt, their long, rigid molecules can align into a highly ordered configuration that produces a number of unique features. These include low heat of crystallization, extremely high flow, and significant melt strength. The molecular structure has such an effect on properties and processing characteristics that LCPs are best treated as a separated polymer category.

There are two types of Liquid Crystal Polymers available: Lyotropic aramids and thermotropic aromatic copolyesters. The lyotropic aramids are processed from solution, such as Kevlar. The thermotropic copolyesters are processed from the molten state and are preferred for thermal-spray processing.

Vectra LCP aromatic polyester polymers are thermotropic and flow readily in the molten state. These and other unique properties make Vectra LCP's ideal for thermal plasma spraying.

Suitable liquid crystal aromatic polyester polymers for use according to the present process include those disclosed in U.S. Pat. Nos. 5,216,092 and 5,296,542, the disclosures of which are hereby incorporated herein by reference thereto. Such polymers are used in the form of a particulate feedstock having an average particle size within the range of 30 to 70 microns. All such LCP polymers have a melting point above 300° C., and are highly impervious to oxygen and water vapor, i.e., they have an oxygen permeation value below about 0.1 $cm^3$-mil/100 $in^2$-day-atm, when measured at 23° C. and 80% relative humidity according to ASTM D1434 and a water vapor transmission note below 0.1 g-mil/100 $in^2$-day @ 100% RH, according to ASTM E96.

According to the present process, the particulate LCP is plasma-sprayed onto the surface of the composite or metallic substrate to be protected, such as a structure on a ship or on a military or commercial aircraft which is subject to substantial damage and degradation due to oxidation, moisture, erosion, fouling, salt spray, wear, ultraviolet radiation, impact, thermal cycling, corrosion and/or other forces.

The conventional plasma spray gun controls all of the critical parameters, including spray rate, temperature of flame and substrate, pressure gun angle, position and traversing rate, and the shape of the 30–50 micron size LCP particles. The substrate material, texture and temperature are variables that influence the details of the process since, the heat-transfer rate of the substrate can prevent or retard controlled cooling of the coating as it is applied. Therefore, according to a preferred embodiment of the invention, a preheat thermal spray gun is mounted in advance of the path of the plasma spray gun, to preheat the substrate to a temperature between about 300° F. and 600° F. with a hot inert gas immediately in advance of application of the LCP coating thereto, and a post-heat thermal spray gun is mounted downstream of the path of the plasma spray gun to post-heat the applied LCP coating with a hot inert gas immediately after application thereof in order to control the cool-down rate of the coating. The preheat and post heat temperatures can be regulated, depending upon the nature of the substrate, in order to provide a uniform cooling rate for the applied LCP coating, independently of the nature of the substrate. The preheat and/or post-heat thermal spray gun may not be required, depending on the properties of the LCP material selected and the substrate material.

Referring to FIG. 1, the apparatus 10 thereof comprises an alignment of a preheat thermal spray gun 11, a plasma spray gun 12 and a post-heat thermal spray gun 13, each mounted at a predetermined stand-off distance "d" relative to the target surface 15 of a substrate 14 to be coated. The substrate 14 and the apparatus 10 are supported for relative movement, in the direction indicated by the arrow in FIG. 1, so that each gun discharges against the substrate surface 15 along a common path to preheat the upstream portion of the path, plasma spray the preheated surface with a coating 16, and post-heat the coating 16 to slow and regulate its cooling rate.

It should be understood that the apparatus of FIG. 1 can consist solely of the plasma spray gun 12, without the thermal spray guns 11 and 13, since satisfactory plasma spray coatings can be applied to most substrates using controlled ambient conditions to regulate the heat-up and cooling rate of the LCP coating on the substrate.

The plasma spray gun 12 of FIG. 1 is a conventional coaxial gun having an outer barrel housing 17 provided with a water jacket 18 to cool the housing 17 and its annular nozzle 19 which comprises a copper anode. The inner barrel 20 of the gun 12 has a hollow bore 21 and an outer annular thoriated tungsten cathode 22. The annular passage 23 between the inner surface of the housing 17 and the outer surface of the barrel 20 is designed to deliver the plasma gas as a swirling vortex to the nozzle 19 where it is ignited by an electric arc between the DC powered anode and cathode, to project a plasma flame 24. The LCP particles are introduced to the bore 21 at a predetermined feed rate for discharge into the vortex of the plasma flame 24, which has a temperature above about 14000° K for a typical DC torch operating at 40 kilowatts. The plasma temperature drops off rapidly from the exit of the anode nozzle 19 and therefore the LCP is introduced at this hottest part of the flame, which swirls axially due to the vortex momentum of the gas, to melt and project the molten LCP particles against the surface 15 of the substrate 14, where the particles cool and, through the repeated deposition of many such particles a deposit build up to form protective coating 16.

In the preferred embodiment illustrated by FIG. 1, the apparatus 10 includes a pair of thermal spray guns 11 and 13 for generating a heated gas flow against the surface 15 of the substrate 14 to preheat the surface 15 or coating 16 to a predetermined temperature, such as between about 300° and 600° F., in advance of each plasma coating spray, and to post heat the coating 16 after each application to a temperature between about 200° F. and 500° F., to regulate or control the cooling thereof, respectively. The thermal spray guns are substantially identical but subject to individual temperature control by regulating the gas composition supplied thereto and the gas flow rate.

The thermal spray guns 11 and 13 each comprise an outer housing 25 having a converging nozzle section 26, and an interior coaxial barrel 27 having a bore 28. An inert gas, argon, is supplied to the annular bore 29 between the housing 25 and the barrel 27 at a predetermined feed rate, and an oxidizable, enthalpy-enhancing gas such as hydrogen is supplied to the barrel bore 28 at a feed rate of 1 liter per minute to produce a combustible mixture at the nozzle 26 which is ignited to form the thermal gas flame 30 which propels the heated gas against the substrate surface 15 and coating 16.

The thickness of the applied coating 16 is governed primarily by the number of repeated passes of the plasma spray gun 12 over the same path or area of the substrate, and the porosity within the coating 16 depends upon the coating temperature, nature of the substrate surface and the LCP material of choice. Typically the thickness is between 5 and 15 mils.

The application of the present plasma spray liquid crystal polymer compositions to the surface of composite structural components, such as aircraft control surfaces, fabricated from an epoxy resin syntactic film mini-sandwich or laminate containing graphite fiber fabric epoxy skins and containing conventional fasteners resulted in an even surface coating of the liquid crystal polymer over the composite surface and fasteners that passed visual inspection with no indication of cracking peeling or other defect. The coated composite was fatigue cycled to 6000 micro inches per inch strain without any cracking, and was subjected to accelerated aging at 350° F. without degradation.

While preferred embodiments of the invention have been disclosed in detail, it should be understood by those skilled in the art that various other modifications may be made to the illustrated embodiments without departing from the scope and spirit of the invention as described in the specification and defined in the appended claims.

What is claimed is:

1. Process for applying a protective coating to a surface of a substrate which is subject to erosion/corrosion during use, which comprises providing a particulate composition comprising a thermotropic liquid crystal polymer having a melting point above about 300° C. and which polymer is impervious to moisture and oxygen, injecting said particulate composition into a gas plasma flame having a temperature above about 14000° K to render the liquid crystal polymer particles molten, projecting said molten particles onto the surface of the substrate to form a uniform even coating thereon having a desired thickness and post-heating to control the cooling rate of the coating to form a protective surface layer over said substrate.

2. Process according to claim 1 in which said substrate comprises a composite laminate of a graphite fiber fabric and an epoxy resin.

3. Process according to claim 1 in which said substrate is metallic.

4. Process according to claim 1 in which said liquid crystal polymer comprises an aromatic polyester polymer.

5. Process according to claim 1 in which said gas plasma flame comprises a mixture of an inert gas and a minor amount of an oxidizable gas.

6. Process according to claim 5 in which said mixture comprises argon and hydrogen.

7. Process according to claim 1 which comprises projecting molten particles repeatedly over the same area of the substrate surface to build up a coating deposit of the desired thickness.

8. Process according to claim 1 which comprises preheating the substrate surface to a temperature between about 300° F. and 600° F. prior to the deposit of the molten liquid crystal polymer particles thereon.

9. Process according to claim 8 which comprises preheating the substrate surface and/or the coating thereon by projecting a hot gas flow comprising an inert gas against the substrate surface and/or against the coating immediately in advance of the deposit of molten particles thereover.

10. Process according to claim 1 which comprises postheating the coating to a temperature between about 200° F. and 500° F. immediately after the deposit of the coating thereon in order to regulate the cooling of the coating.

11. Process according to claim 10 which comprises postheating the coating by projecting a hot gas flow comprising an inert gas against the coating immediately after the deposit of the molten particles in order to regulate the cooling of the coating.

* * * * *